Feb. 4, 1941.    M. M. LONG    2,230,757
POSTHOLE DIGGER
Filed June 25, 1940    3 Sheets-Sheet 1

Inventor
MATHIAS M. LONG,

By Clarence A. O'Brien

Attorney

Feb. 4, 1941.   M. M. LONG   2,230,757
POSTHOLE DIGGER
Filed June 25, 1940   3 Sheets-Sheet 2
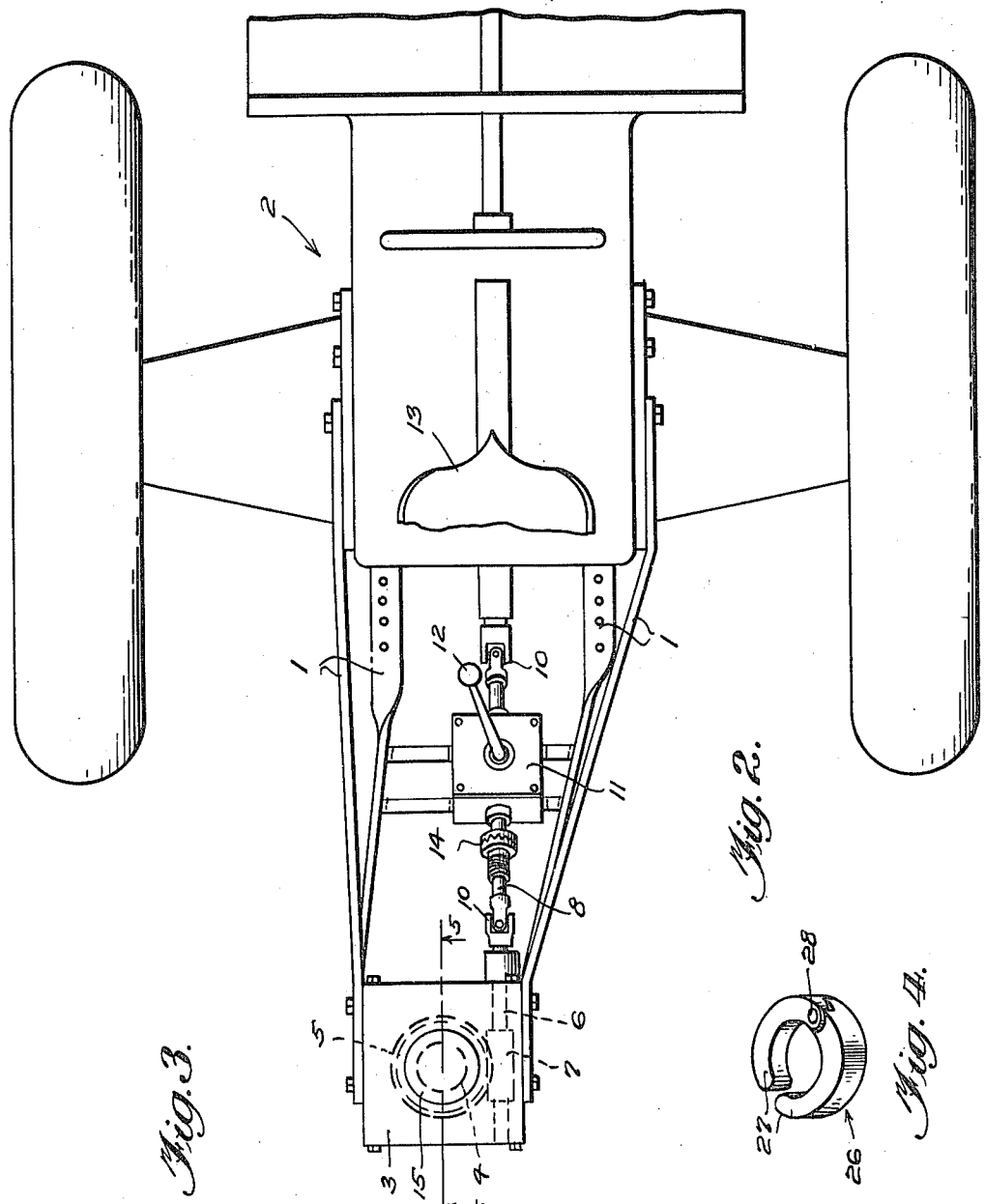
Inventor
MATHIAS M. LONG,
By Clarence A. O'Brien
Attorney Feb. 4, 1941. M. M. LONG 2,230,757
POSTHOLE DIGGER
Filed June 25, 1940 3 Sheets-Sheet 3
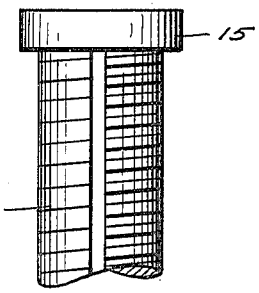
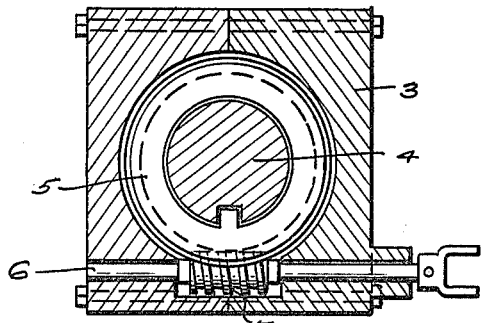
Fig. 6.
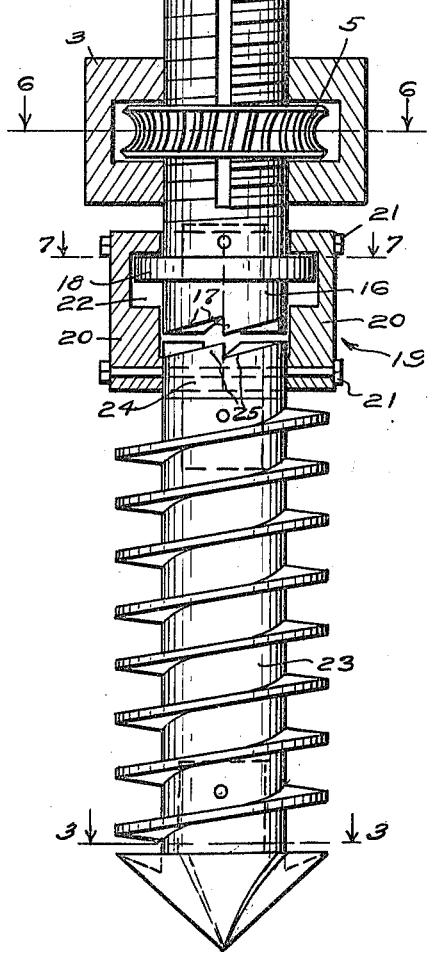
Fig. 5.
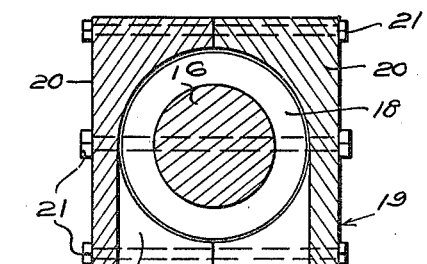
Fig. 7.
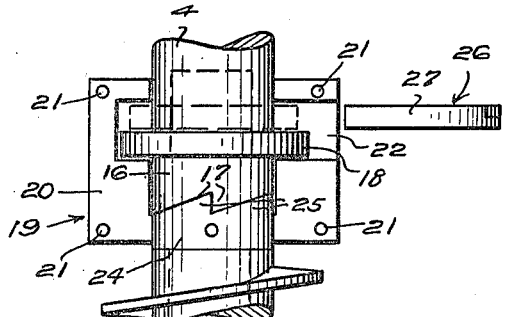
Fig. 8.
Inventor
MATHIAS M. LONG,
By Clarence A. O'Brien
Attorney Patented Feb. 4, 1941

2,230,757

UNITED STATES PATENT OFFICE 2,230,757

POSTHOLE DIGGER

Mathias M. Long, Lake Park, Iowa

Application June 25, 1940, Serial No. 342,374

6 Claims. (Cl. 255—19)

The present invention relates to new and useful improvements in posthole diggers and has for its primary object to provide, in a manner as hereinafter set forth, a device of this character which is adapted to be expeditiously mounted on the rear end of a conventional tractor and driven from the power plant thereof.

Another very important object of the invention is to provide, in a portable posthole digger of the type including a power driven auger, a unique construction and arrangement for withdrawing the auger from the earth after the hole has been dug.

Other objects of the invention are to provide a portable, power driven posthole digger of the auger type which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a top plan view thereof.

Figure 3 is a view in horizontal section through the lower portion of the auger, taken substantially on the line 3—3 of Fig. 5.

Figure 4 is a detail view in perspective of the device which is used for preventing disconnection of the screw shaft from the auger when desired.

Figure 5 is a vertical sectional view, taken substantially on the line 5—5 of Fig. 2.

Figure 6 is a view in horizontal section, taken substantially on the line 6—6 of Fig. 5.

Figure 7 is a view in horizontal section, taken substantially on the line 7—7 of Fig. 5.

Figure 8 is a view in side elevation showing the manner of using the device illustrated in Fig. 4 of the drawings.

Figure 1:
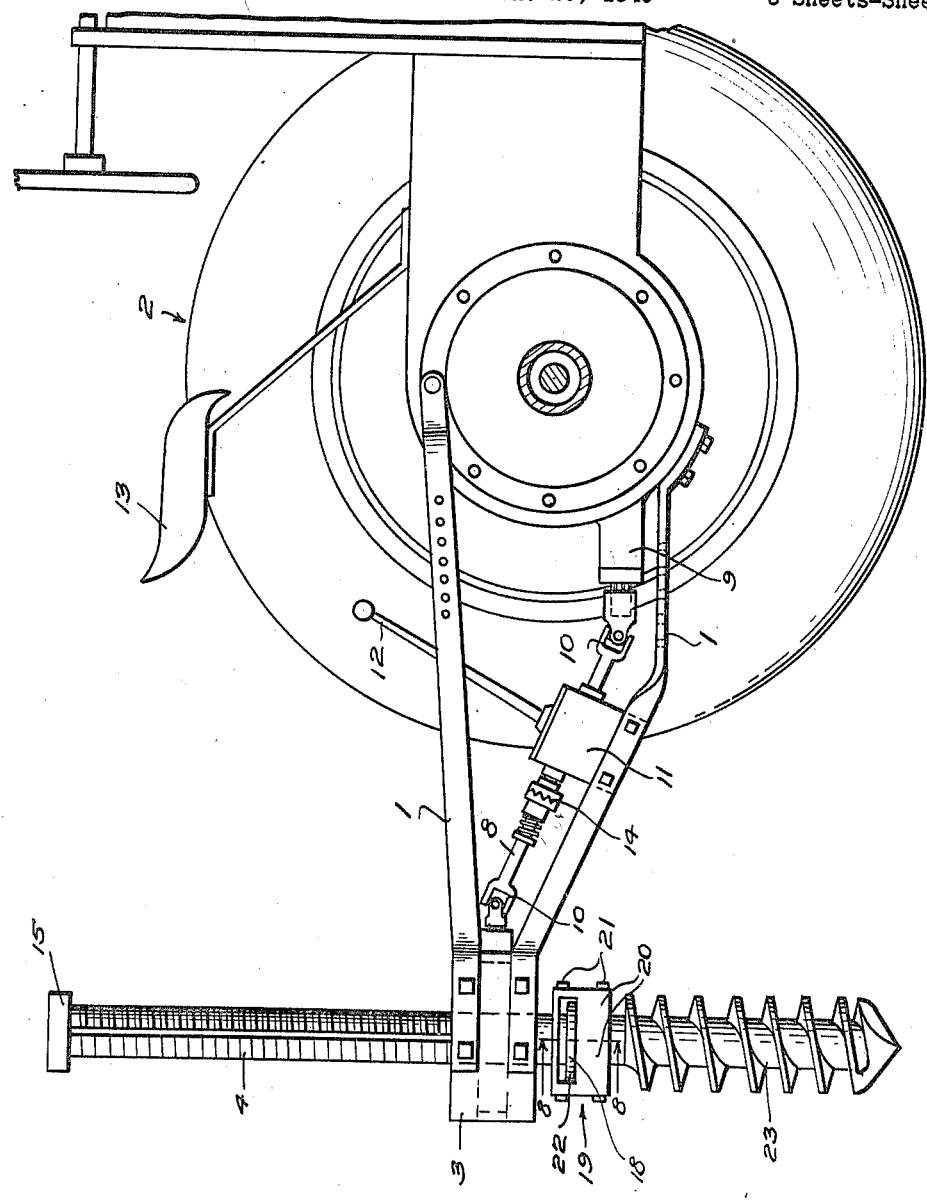
Figure 1 is a view in side elevation of a posthole digger constructed in accordance with the present invention, showing the device mounted on the rear end of a tractor.

Referring now to the drawings in detail, it will be seen that the embodiment of the invention which has been illustrated comprises a plurality of metallic bars 1 which are rigidly secured on the rear end portion of a tractor 2 and which project rearwardly from said tractor. Mounted on the rear end portions of the bars 1 is a gear case 3. Extending through the gear case 3 and threadedly mounted therein is a vertical screw shaft 4.

Rotatable in the case 3 is a worm gear 5 which is splined to the screw shaft 4. Journaled longitudinally in one side portion of the case 3 is a shaft 6 having fixed thereon a worm gear 7 which drives the gear 5. A shaft 8 connects the shaft 6 to the power take-off 9 of the tractor 2 for actuation by the power plant of said tractor. Suitable universal joints 10 are provided at the ends of the shaft 8. Interposed in the shaft line 8 is a suitable forward and reverse gear transmission 11 which is mounted on certain of the bars 1. The shift lever 12 of the transmission 11 may be conveniently operated from the driver's seat 13 of the tractor 2. Also interposed in the shaft line 8 is a slip clutch 14 for preventing breakage of parts in the event of an overload.

A cap 15 is provided on the upper end of the screw shaft 4. The screw shaft 4 includes a removable lower portion 16 having clutch teeth 17 on its lower end. The lower portion 16 of the screw shaft 4 further includes a collar or flange 18.

Mounted on the lower portion 16 of the screw shaft 4 is a housing of suitable metal which is designated generally by the reference numeral 19. The housing 19 comprises a pair of complemental half sections 20 firmly secured together by bolts 21. Formed in the upper portion of the housing 19 is a chamber 22 in which the collar or flange 18 is operable, said chamber 22 being open at one side of said housing.

Mounted in the housing 19 and depending therefrom is an auger 23. The auger 23 includes a removable upper portion 24 through which one of the bolts 21 passes for rigidly securing said auger to the housing 19. On the upper end of the removable portion 24 of the auger 23 are clutch teeth 25 for engagement by the clutch teeth 17 for operatively connecting the auger 23 to the screw shaft 4 for actuation in one direction thereby.

It is thought that the operation of the device will be readily apparent from a consideration of the foregoing. Briefly, the transmission 11 is shifted for driving the screw shaft 4 in the desired direction from the power take-off 9 of the tractor 2. Thus, the screw shaft 4, the housing 19, the auger 23, etc., are lowered. When the auger 23 comes to rest on the surface of the ground it, with the housing 19, ceases to rotate. However, the screw shaft 4 continues to rotate and moves downwardly through the case 3, thus engaging the clutch teeth 17 and 25 for actuating the auger 23. During this movement the collar or flange 18 moves downwardly in the chamber 22 of the housing 19. In the foregoing manner the auger 23 is driven into the ground to the desired depth for digging the hole. When the hole has been dug to the desired depth the direction of rotation of the screw shaft 4 is reversed through the medium of the transmission 11. When this occurs the clutch teeth 17 are disengaged from the clutch teeth 25 thereby disconnecting the auger 23 from the screw shaft 4. The screw shaft 4 is elevated, the collar or flange 18 moving upwardly in the chamber 22. When the collar or flange 18 reaches the top of the chamber 22 it picks up the housing 19 and continued elevation of the screw shaft 4 now pulls the auger 23 out of the hole without rotating said auger. In this manner the walls of the hole are smoothed and dirt remaining in the auger is prevented from falling back thereinto.

In Figs. 4 and 8 of the drawings, the reference numeral 26 designates a substantially U-shaped spacer which is adapted to be slipped into the chamber 22 on the lower portion of the screw shaft 4 between the collar or flange 18 and the top of said chamber. The spacer 26 includes a pair of elements 27 which are pivotally connected at 28. Should the auger 23 be stuck in the ground so firmly that it cannot be pulled from the hole, the spacer 26 is mounted on the screw shaft 4 above the collar or flange 18 as suggested in dotted lines in Fig. 8 of the drawings. Thus, the collar or flange 18 is positively prevented from moving upwardly in the chamber 22 and the clutch teeth 17 are locked in engagement with the clutch teeth 25. The auger 23 is now positively connected to the screw shaft 4 and may be backed out of the hole.

It is believed that the many advantages of a posthole digger constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A power driven posthole digger comprising a supporting structure, a vertically movable screw shaft threadedly mounted on said supporting structure, means for rotating said screw shaft in either direction, an auger slidably and rotatably mounted on the screw shaft and depending therefrom, and means operatively connecting the auger to the screw shaft for rotation thereby in one direction.

2. A post hole digger of the character described comprising a vertically movable screw shaft, means for rotating said screw shaft in either direction for lowering or elevating same, an auger rotatably and slidably mounted on one end portion of the screw shaft, and one way clutch means for connecting the auger to the screw shaft for actuation thereby in one direction only.

3. A posthole digger of the character described comprising a vertically movable screw shaft, means for rotating said screw shaft in either direction, a housing rotatably and slidably mounted on one end portion of the screw shaft, means for limiting the sliding movement of the housing relative to the screw shaft, an auger secured to the housing, and coacting means on the screw shaft and auger for operatively connecting said auger to said screw shaft for actuation thereby in one direction.

4. A posthole digger of the character described comprising a vertically movable screw shaft, means for rotating said screw shaft in either direction for lowering and elevating same, a housing rotatably and slidably mounted on the screw shaft, a collar on the screw shaft operable in the housing for limiting the sliding movement of said housing relative to said screw shaft, an auger fixed to the housing, and coacting one way clutch teeth on one end of the screw shaft and the auger for connecting said auger to said screw shaft for actuation in one direction thereby.

5. A posthole digger comprising, in combination with a tractor including a power take-off, a case mounted on the tractor, a screw shaft threadedly mounted in said case for vertical movement, drive means operatively connecting the screw shaft to the power take-off of the tractor for actuation thereby, said drive means including a transmission for rotating the screw shaft in either direction, an auger rotatably and slidably mounted on one end portion of the screw shaft, and coacting clutch means on the screw shaft and the auger for connecting said auger to said screw shaft for actuation in one direction thereby.

6. A posthole digger of the character described comprising a supporting structure, a vertically movable screw shaft threadedly mounted on said supporting structure, means for rotating said screw shaft in either direction, an auger rotatably and slidably mounted on the screw shaft, means releasably connecting the auger to the screw shaft for actuation thereby in a direction to drive said auger into the ground, and means non-rotatably connecting the auger to the screw shaft for pulling said auger out of the ground when the screw shaft is rotated in the opposite direction.

MATHIAS M. LONG.